US012417862B2

(12) United States Patent
Sakurai et al.

(10) Patent No.: US 12,417,862 B2
(45) Date of Patent: Sep. 16, 2025

(54) CABLE

(71) Applicant: Proterial, Ltd., Tokyo (JP)

(72) Inventors: Tamotsu Sakurai, Tokyo (JP); Hiromitsu Kuroda, Tokyo (JP); Yoshiki Nakade, Hitachi (JP); Minoru Takatsuto, Hitachi (JP); Atsuro Yaguchi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 196 days.

(21) Appl. No.: 18/128,115

(22) Filed: Mar. 29, 2023

(65) Prior Publication Data

US 2023/0368941 A1 Nov. 16, 2023

(30) Foreign Application Priority Data

May 13, 2022 (JP) ................................ 2022-079317

(51) Int. Cl.

*H01B 7/18* (2006.01)
*H01B 1/02* (2006.01)
*H01B 7/02* (2006.01)
*H01B 7/04* (2006.01)
*H01B 7/22* (2006.01)
*H01B 11/10* (2006.01)

(52) U.S. Cl.

CPC .......... *H01B 7/1875* (2013.01); *H01B 1/026* (2013.01); *H01B 7/226* (2013.01)

(58) Field of Classification Search

CPC ........ H01B 7/226; H01B 7/0225; H01B 7/04; H01B 7/18; H01B 11/1041; H01B 11/1008

See application file for complete search history.

(56) References Cited

U.S. PATENT DOCUMENTS

| | | | | |
|---|---|---|---|---|
| 6,417,445 | B1 * | 7/2002 | Sato | H01B 11/1808 174/36 |
| 9,431,726 | B2 | 8/2016 | Tanaka et al. | |
| 2014/0202729 | A1 | 7/2014 | Tanaka et al. | |
| 2016/0284437 | A1 * | 9/2016 | Inoue | C22C 9/00 |
| 2021/0398713 | A1 | 12/2021 | Huang et al. | |
| 2022/0076864 | A1 * | 3/2022 | Huang | H01B 11/1895 |

FOREIGN PATENT DOCUMENTS

| | | | |
|---|---|---|---|
| JP | 2005-089805 | A | 4/2005 |
| JP | 2007-188738 | A | 7/2007 |
| JP | 2014-143015 | A | 8/2014 |
| JP | 2022-003613 | A | 10/2022 |

OTHER PUBLICATIONS

Japanese Office Action dated Jun. 17, 2025 in Japanese Patent Application No. 2022-079317 with machine English translation.

* cited by examiner

*Primary Examiner* — Timothy J Thompson
*Assistant Examiner* — Amol H Patel
(74) *Attorney, Agent, or Firm* — MCGINN I.P. LAW GROUP, PLLC

(57) ABSTRACT

A cable is provided with a cable core including one or more electric wires, a shield layer provided to cover around the cable core and composed of a laterally wound shield formed by winding metal wire strands helically, and a sheath provided to cover around the shield layer. The metal wire strands are semi-hard copper alloy wires, and P/PD, which is the ratio of the winding pitch P in the laterally wound shield to the pitch diameter PD of the shield layer, is less than 9.9.

5 Claims, 2 Drawing Sheets

CABLE

CROSS-REFERENCE TO RELATED APPLICATIONS

The present patent application claims the priority of Japanese patent application No. 2022-079317 filed on May 13, 2022, and the entire contents thereof are hereby incorporated by reference.

TECHNICAL FIELD

The present invention relates to a cable.

BACKGROUND OF THE INVENTION

Conventional cables, for example, have a cable core (i.e., core assembly, aggregated core) with a plurality of signal lines and power lines twisted together, a tape member arranged helically around the cable core, a shield layer arranged around the tape member, and a sheath (sheath) arranged around the shield layer (See, e.g., Patent Literature 1).

CITATION LIST

Patent Literature 1: JP2014-143015A

SUMMARY OF THE INVENTION

Now, in cables used for internal wiring of small industrial robots or for medical applications such as endoscopes, the cables are repeatedly bent or torsional. In addition, in cables used for internal wiring of automobiles and small electronic devices, cables are sometimes bent into a shape that is appropriate for the wiring location. Therefore, there is a demand to improve the resistance of the cables, especially when they are bent.

It is therefore an object of the present invention to provide a cable capable of improving resistance to bending.

For solving the above problem, one aspect of the present invention provides a cable equipped comprising a cable core including one or more electric wires, a shield layer provided to cover around the cable core and comprising a laterally wound shield (i.e., transversally wrapped shield, spiral covered shield) formed by winding metal wire strands helically, and a sheath provided to cover around the shield layer, wherein each of the metal wire strands is a semi-rigid copper alloy wire, and wherein P/PD, which is a ratio of a winding pitch P in the laterally wound shield to a pitch diameter PD of the shield layer, is less than 9.9.

Advantageous Effects of the Invention

The present invention can provide a cable capable of improving resistance to bending.

DETAILED DESCRIPTION OF THE INVENTION

Embodiment

Next, the embodiment of the invention will be explained below in conjunction with appended drawings.

Figure 1:
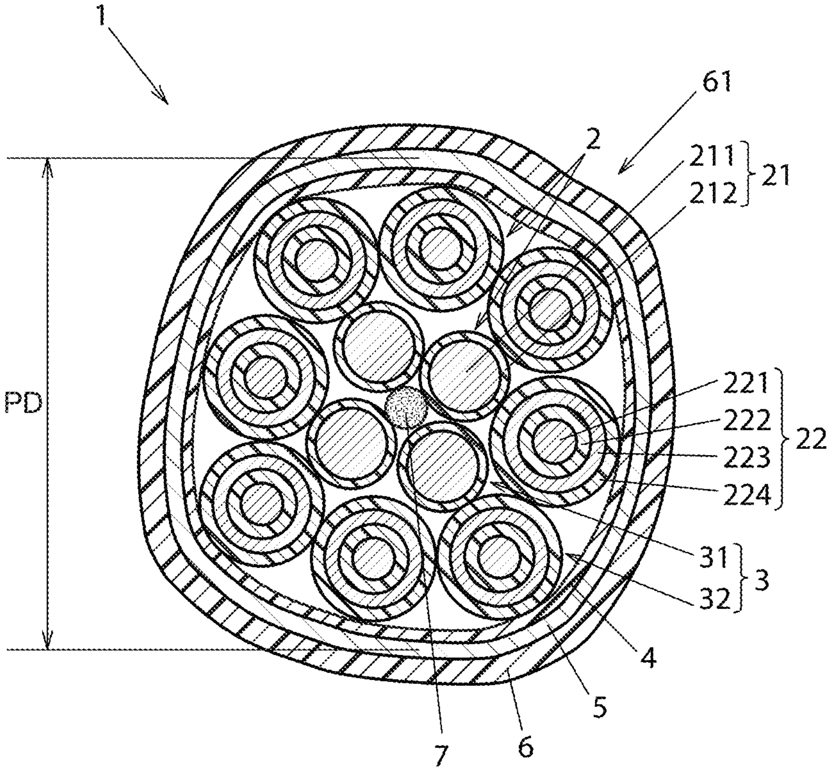
FIG. 1 is a cross-sectional view of a cable perpendicular to a cable longitudinal direction according to one embodiment of the present invention.

FIG. 1 is a cross-sectional view of a cable perpendicular to a longitudinal direction according to one embodiment of the present invention. A cable 1 is used, e.g., for internal wiring of small industrial robots or as a medical cable for endoscopes and other medical applications where bending and torsion are applied.

The cable 1 includes a cable core 3 including one or more electric wires 2, a shield layer 5 provided to cover around the cable core 3 and composed of a laterally wound shield formed by winding metal wire strands helically around the cable core 3, and a sheath 6 provided to cover around the shield layer 5.

Electric Wire 2

The cable core 3 includes, as the electric wires 2, a plurality of first electric wires 21 and a plurality of second electric wires 22 provided to surround the plurality of first electric wires 21. The cable core 3 may have the electric wires 2 consisting of the first electric wires 21. The cable core 3 may also have the electric wires 2 consisting of the second electric wires 22. The cable core 3 may also include, as the electric wires 2, a twisted pair wire comprising two insulated electric wires twisted in pair.

The first electric wire 21 comprises an insulated electric wire having a conductor 211 and an insulator 212 provided to cover around the conductor 211. In this embodiment, the first electric wire 21 is used as a power line for supplying power. The cable 1 shown in FIG. 1 has a structure in which only four first electric wires 21 are arranged substantially concyclically over the cable center, but is not limited to this structure. For example, the cable 1 may have a structure in which a plurality of first electric wires 21 and signal wires for signal transmission (e.g., coaxial cables such as the second electric wires 22) are arranged substantially concyclically over the cable center. In this case, the signal line should have an outer diameter equivalent to that of the first electric wire 21. This allows the outer diameter of the cable 1 to be reduced with a structure in which the first electric wire 21 as the power wire and the signal wire are arranged on a common circle.

The conductor 211 of the first electric wire 21 is composed of a plurality of wire strands (i.e., element wires). The conductor 211 comprises a stranded wire conductor, e.g., a plurality of wire strands composed of metal wire strands twisted together in a state of the bunch or concentric stranding. As the wire strands used for conductor 211, it is desirable to use a thin metal wire with an outer diameter of 0.01 mm or more to 0.03 mm or less, for example. The wire strand used for conductor 211 should be a metallic wire composed of a copper alloy wire such as a Cu—Ag alloy so that strength can be maintained even with a thin outer diameter. The outer diameter of conductor 211 should be 0.01 mm or more to 0.03 mm or less. Fluororesin such as PFA (perfluoroalkyl vinyl ether copolymer) may be used as the insulator 212, which can have the desired insulation performance even with a thin thickness. The insulator 212 may be made by laminating two or more insulating layers. In this case, for example, the insulating layer where the insulator 212 contacts the outer surface of the conductor 211 may be composed of a resin such as polypropylene or polyethylene, and the insulating layer provided around the insulating layer may be composed of a fluoropolymer resin. By having the insulator 212 composed of the above-described layers of insulation, it is easier to adjust the thickness of the insulator 212 and the mechanical properties of the first electric wire 21, such as flexibility and wearability.

The second electric wire 22 comprises a coaxial wire having an inner conductor 221, an inner insulator 222 provided to cover around the inner conductor 221, an outer conductor 223 provided to cover around the inner insulator 222, and an outer insulator 224 provided to cover around the outer conductor 223. The second electric wire 22 is used as a signal line for signal transmission. In other words, the cable 1 is a composite cable with a first electric wire 21 as a plurality of power lines and a second electric wire 22 as a plurality of signal lines. The cable 1 shown in FIG. 1 has a structure in which only eight second electric wires 22 are arranged on a common circle over the cable center, but is not limited to this structure. For example, the cable 1 may have a structure in which a plurality of second electric wires 22 and power supply wires (insulated electric wires such as the first electric wire 21, for example) for supplying power are arranged on a common circle over the cable center. In this case, the power supply wire should have an outer diameter equivalent to that of the second electric wire 22. By having the power wire and the second electric wire 22 have equivalent outer diameters, the outer diameter of the cable 1 can be reduced because the extra gap inside the cable 1 can be reduced in a structure in which the second electric wire 22 as a signal wire and the power wire are arranged on a common circle over the cable center.

The inner conductor 221 of the second electric wire 22 comprises a stranded wire conductor composed of a plurality of wire strands composed of metal wire strands twisted together in a concentrative or concentric stranded state. The outer conductor 223 is composed of a laterally wound shield in which wire strands composed of metal wire are helically wrapped around the inner insulator 222. The outer conductor 223 may be formed of a braided shield consisting of multiple wire strands of metal wire braided together. As the wire strands used for the inner conductor 221 and the outer conductor 223, it is desirable to use a fine metal wire, for example, with an outer diameter of 0.01 mm or more and 0.03 mm or less. For the inner conductor 221 and the outer conductor 223, it is recommended to use metal wire strands composed of copper alloy wires such as Cu—Ag alloy and Cu—Sn—In alloy so that strength can be maintained even with a thin diameter. Fluoropolymer resin such as PFA should be used as the inner insulator 222 and outer insulator 224, which can have the desired insulating performance even with a thin thickness. When the outer insulator 224 is composed of fluoropolymer resin, wear caused by contact between the first electric wire 21 and the second electric wire 22 can be reduced. The inner insulator 222 may be composed of two or more insulation layers laminated together. In this case, for example, the insulating layer in contact with the inner conductor 221 may be composed of fluoropolymer resin, and the insulating layer around it may be composed of a resin other than fluoropolymer resin (e.g., polypropylene, polyethylene or other resin). When the inner insulator 222 comprises two or more insulating layers as described above, cracks in the inner insulator 222 are less likely to occur when the cable 1 is subjected to bending or torsion, and thus wire break (i.e., disconnection) of the second electric wire 22 can be suppressed.

Cable Core 3

The cable core 3 has an inner layer 31 composed of a plurality of twisted first electric wires 21 (four wires in this case) and an outer layer 32 composed of a plurality of twisted second electric wires 22 (eight wires in this case) around the inner layer 31. The total number of electric wires 2 included in the cable core 3 is 12 in this case. However, the number of electric wires 2 (the number of first electric wires 21 and the number of second electric wires 22) included in the cable core 3 is not limited to this, for example, the total number may be & or more and 16 or less. The number of second electric wires 22 should be larger than the number of first electric wires 21. More specifically, the number of second electric wires 22 may be at least twice and not more than three times the number of first electric wires 21. This will cause the plurality of adjacent second electric wires 22 to contact each other, the plurality of adjacent first electric wires 21 to contact each other, and the plurality of adjacent second electric wires 22 and first electric wires 21 to contact each other. Therefore, in the cable 1, when the second electric wire 22 has a larger outer diameter than the first electric wire 21, extra space in the cable core 3 can be eliminated and the cable 1 can be made smaller in diameter.

When the cable core 3 comprises a first electric wire 21 and a second electric wire 22, the first electric wire 21 having a smaller outer diameter than the second electric wire 22 is placed in the inner layer 31 and the second electric wire 22 having a larger outer diameter than the first electric wire 21 is placed in the outer layer 32, thereby enabling the cable 1 to be made smaller in diameter and also its resistance to bending and torsion can also be improved. For example, if the cable core 3 is structured so that the second electric wire 22 with a larger outer diameter is placed in the inner layer 31 and the first electric wire 21 with a smaller outer diameter is placed in the outer layer 32, stress is concentrated on the first electric wire 21 with a smaller outer diameter than the second electric wire 22 during bending and torsion of the cable 1 and wire break may easily occur, and in addition, the wasted space between each electric wires 2 (especially between the first electric wires 21) becomes larger, leading to a larger diameter of the cable 1 as a whole.

In the present embodiment, tensile strength fiber 7 is placed in the cable center (the center portion in the cross-section perpendicular to the cable longitudinal direction), and a plurality of first electric wires 21 are twisted around this tensile strength fiber 7 to form the inner layer 31. The tensile strength fiber 7 can be composed of aramid fiber, for example. This makes it easier to make the cable 1 thinner than a structure in which thread-like inclusions such as staple fiber or jute are placed in the cable center. The cable 1 does not need to have the tensile strength fibers 7 in the cable center.

Tape Member 4

The cable 1 has a tape member 4 helically wrapped around the cable core 3. The tape member 4 serves to hold the cable core 3 so that the twists of the cable core 3 do not become untwisted. For example, a resin tape composed of polyimide or other resin can be used as the tape member 4. For example, a metal foil tape consisting of a metal foil composed of aluminum, copper, or the like laminated to a resin tape can be used as the tape member 4. From the viewpoint of increasing the flexibility of the cable 1, such tape member 4 should be wrapped in the same direction as the direction in which the plurality of electric wires 2 comprising the cable core 3 are twisted together (=torsion direction).

Sheath 6

A shield layer 5 is provided to cover around the tape member 4, and a sheath 6 is provided to cover around the shield layer 5. Details of the shield layer 5 are described below, The sheath 6 serves to protect the shield layer 5 and the cable core 3. Due to the narrower diameter of the cable 1, the thickness of the sheath 6 should be as thin as possible, preferably less than 0.20 mm. More desirably, the thickness of the sheath 6 should be 0.06 mm or more and less than 0.20 mm, more preferably 0.06 mm or more and less than 0.16 mm. The thickness of the sheath 6 of 0.06 mm or more ensures the strength of the sheath 6 and prevents cracks in the sheath 6 when it is repeatedly bent and torsional. The thickness of the sheath 6 is less than 0.20 mm, more preferably less than 0.16 mm, to prevent the cable 1 from becoming larger in diameter. In the present invention, the "thickness of the sheath 6" means the average value of the thickness of the sheath 6 obtained by the test method specified in JIS C 3005 at any cross section of the cable 1 shown in FIG. 1 in the longitudinal direction.

The outer diameter of the sheath 6, i.e., the maximum outer diameter of the cable 1 (hereinafter also referred to as the maximum outer diameter of the sheath 6), is 2.0 mm or less. More preferably, it is 1.0 mm or more and 2.0 mm or less. This allows the cable 1 to be routed in a very narrow space. As the sheath 6, a fluoropolymer resin such as PFA that can be formed to the thickness of the sheath 6 described above should be used. In the present invention, the "maximum outer diameter of the cable 1" does not mean one specific location with the largest outer diameter in the longitudinal direction of the cable 1, but means the outer diameter of the cable 1 at the portion where the outer diameter of the sheath 6 is largest in the cross section of any location in the longitudinal direction of the cable 1 shown in FIG. 1. The outer diameter of the cable 1 can be determined based on the test method specified in JIS C 3005.

Although the sheath 6 is made up of one layer in this embodiment, the sheath 6 may be made up of two layers, consisting of an inner layer and an outer layer. In this case, the inner layer should be a layer that enhances heat dissipation and may be, for example, composed of a resin composition with a heat dissipating filler in a base resin (fluoropolymer resin).

The cable 1 may have irregularities along the circumferential direction at predetermined locations on the outer surface of the sheath 6. For example, as shown in FIG. 1, the outer surface of the cable 1 may have concaves 61 at predetermined locations along the circumferential direction. Having such convex-concaves in the cable 1 makes it easier to route the cable to space-saving wiring portions than when the outer surface of the sheath 6 is smoothly curved along the circumferential direction of the cable (i.e., when the outer surface of the sheath 6 in a cross-section perpendicular to the cable longitudinal direction is circular in shape).

Shield Layer 5

The shield layer 5 is composed of a laterally wound shield formed by winding (wrapping) metal wire strands helically around the tape member 4. For example, when the shield layer 5 is composed of a braided shield including braided metal wire strands, especially when thin metal wire strands are used, the repeated bending of the cable 1 causes the metal wire strands to rub against each other, which is likely to cause the metal wire strands to break. In contrast, by configuring the shield layer 5 with a laterally wound shield as in the present embodiment, friction between metal wire strands during bending of the cable 1 can be suppressed and bending resistance can be improved. When the shield layer 5 is composed of a braided shield, the thickness of the shield layer 5 becomes thicker due to the overlapping of metal wire strands, resulting in a larger outer diameter of the cable 1. The outer diameter of the cable 1 can be maintained at a thin diameter.

Metal Wire Strands Used for the Shield Layer 5

In this embodiment, semi-hard copper alloy wires are used as the metal wire strands used in the shield layer 5. For example, a semi-hard copper-silver alloy wire containing 1 wt % or more and 3 wt % or less silver and the balance consisting of copper and inevitable impurities can be used as such a metal wire strand. Metal wire strands other than semi-hard copper-silver alloy wires may also be used, for example, semi-hard copper alloy wires containing chromium, zirconium, magnesium, indium, tin, etc. at a content of 0.01 wt % or more and 0.50 wt % or less, the balance consisting of copper and inevitable impurities (such as Cu—Cr alloy, Cu—Zr alloy, Cu—Mg alloy, Cu—Sn alloys, Cu—Sn—In alloys, Cu—In alloys, etc.). Semi-hard copper alloy wires have a tensile strength of 350 MPa or more and 500 MPa or less and an elongation of 5% or more and less than 10%. In general, hard copper alloy wires have an elongation of less than 5%, and soft copper alloy wires have an elongation of 10% or more. The "elongation" and "tensile strength" herein mean "elongation at break" and "tensile strength" obtained by the test method specified in JIS Z 2241.

By using semi-hard copper alloy wires as the metal wire strands of the shield layer 5, the tensile strength of the metal wire strands increases, and the bending resistance of the shield layer 5 can be improved. This is because when the cable 1 is bent, tensile strain is loaded on the surface of the metal wire strand outside the bend, but the higher the tensile strength of the metal wire strand, the higher the yield stress (0.2% proof stress in the case of copper) at which plastic deformation begins and the smaller the amount of plastic deformation. In other words, a metal wire strand with a higher tensile strength has less strain accumulated due to repeated bending, resulting in a greater number of bending cycles before fracture and improved bending resistance.

If the elongation of the metal wire strands used in the shield layer 5 is too small, the bending resistance of the shield layer 5 will also decrease. However, by using semi-hard copper-silver alloy wire as the metal wire strand of the shield layer 5, the decrease in bending resistance due to elongation can also be controlled. However, the inventors have found that too much elongation also reduces strength and bending resistance, so it is desirable that the elongation of the metal wire strands used in the shield layer 5 be less than 10%. Thus, by using a semi-hard copper alloy wire with relatively high tensile strength and elongation (tensile strength of 350 MPa or more and 500 MPa or less and elongation of 5% or more and less than 10%) as the metal wire strand of the shield layer 5, the bending resistance of the shield layer 5 can be improved. When a copper-silver alloy wire that is semi-hard, has a tensile strength of 350 MPa or more and 500 MPa or less, and an elongation of 5% or more and less than 10% is used as the metal wire strand, the above-mentioned actions and effects are particularly easily obtained.

Since very thin metallic wire strands are used in the present form, if the copper used contains a large amount of impurities, the electric wire breakage is likely to occur starting from the impurities. Therefore, it is more desirable to use copper alloy wires with a copper purity of 99.99% or higher as the metal wire strands used in the shield layer 5.

Furthermore, it is more desirable for the metal wire strands used in the shield layer 5 to have an electrical conductivity of at least 85% IACS. This improves heat dissipation.

Semi-hard copper alloy wires used as metal wire strands can be obtained by heating a hard copper alloy wire (tensile strength of 800 MPa or more and elongation of 1% or more) at a predetermined temperature (500 degrees C. or more and 650 degrees C. or less) for a short time of 1.5 seconds or less.

Winding Pitch P of Shield Layer 5

Furthermore, in this embodiment, a winding pitch P in the shield layer 5 composed of a laterally wound shield is set so that P/PD, a ratio of the winding pitch P to a pitch diameter PD of the shield layer 5, is less than 9.9. In this embodiment, P/PD is set to be 6.6 or more and less than 9.9. The winding pitch P is the interval along the longitudinal direction of the cable at the points where the circumferential position is the same in any metal wire strands that constitute the shield layer 5.

The pitch diameter PD of the shield layer 5 means the diameter of a circle passing through the center of the shield layer 5 (the center of the metal wire strands) in a cross-section perpendicular to the cable longitudinal direction. The pitch diameter PD of the shield layer 5 can be calculated by adding together the maximum outer diameter of the cable core 3, the thickness of the tape member 4×2, and the radius of the metal wire strands×2. The "maximum outer diameter of the cable core 3" does not mean one specific location with the largest outer diameter in the longitudinal direction of the cable core 3, but means the outer diameter of the cable core 3 at the portion with the largest outer diameter in the cross-section of any location in the longitudinal direction of the cable 1 shown in FIG. 1.

In the present study, the pitch diameter PD of the shield layer 5 is 1.36 mm. In this case, the winding pitch P should be 9 mm or more and less than 13.5 mm.

If the winding pitch P of the laterally wound shield is made too large, the metal wire strands are arranged in a state nearly parallel to the longitudinal direction of the cable, and the bending strain applied to the metal wire strands when they are bent increases, resulting in a decrease in bending resistance. By reducing the winding pitch P of the laterally wound shield, more specifically, by setting P/PD to less than 9.9, the strain accumulated in the metal wire strands when repeatedly bent can be reduced and the bending resistance can be improved.

When the pitch diameter PD of the shield layer 5 is 1.36 mm, the winding pitch P of the metal wire strands in the shield layer 5 is 10 mm or more and less than 13.5 mm, i.e., P/PD is 7.3 or more and less than 9.9, to maintain the resistance to bending as described above and to improve the resistance to repeated torsion, i.e., resistance to torsion. In other words, the resistance to repeated torsion, or torsion resistance, can be improved while maintaining the resistance to bending as described above.

Outer Diameter of Metal Wire Strands Used in the Shield Layer 5

By the way, in conventional cables, when the sheath provided in the outermost layer of the cable is less than 0.20 mm in thickness in order to reduce the diameter (i.e., to reduce the maximum outer diameter of the sheath to 2.0 mm or less), cracks may appear in the sheath when the cable is repeatedly bent or torsional. The inventors have examined the cable and found that when the cable is torsional repeatedly, waviness (i.e., undulation) is generated in the shield layer in a part of the cable longitudinal direction, and wire break occurs in the metal wire strands that constitute the shield layer in the wavy part. The sheath in contact with the broken wire in the shield layer and the sheath in contact with the broken wire rub against each other by torsion, causing the sheath to wear down and cracks to appear in the . . . sheath. The inventors have found that such undulation in the shield layer is caused by such factors as the fact that during torsion, when the outer diameters of the multiple metal strands constituting the shield layer have a predetermined outer diameter, the shield layer falls together with the tape member to the cable core side (in FIG. 1, the valley between the circumferentially adjacent second electric wires 22), creating a gap between the tape member and the sheath.

Therefore, in the present cable 1, when the maximum outer diameter of the sheath 6 is 2.0 mm or less, the outer diameter of the metal wire strands used in the shield layer 5 is ½ or more and 1 or less times the thickness of the sheath 6. By setting the outer diameter of the metal wire strands at ½ times or more than the thickness of the sheath 6, it is possible to suppress the rigidity of the metal wire strand from becoming too low, and when the cable 1 is torsional repeatedly, the metal wire strands together with the tape member 4 are prevented from falling into a cable core 3-side (valley between adjacent second electric wires 22 in the circumferential direction) and the gap formation between the tape member 4 and the sheath 6 is prevented. As a result, it is possible to suppress the occurrence of waviness in the shield layer 5, which makes it possible to suppress the occurrence of wire breakage in the shield layer 5 caused by waviness, and to suppress the occurrence of cracking in the sheath 6 caused by rubbing against the broken portion of the shield layer 5. In addition, by setting the outer diameter of the metal wire strands at ½ times or more than the thickness of the sheath 6, defects such as a decrease in the strength of the metal wire strand and a tendency to break wires can also be suppressed. In the present invention, the "outer diameter of the metal wire strands" means the average value of the diameters of the metal wire strands constituting the shield layer 5 when measured by the test method specified in JIS C 3002.

If, for example, the outer diameter of the metal wire strands exceeds one time the thickness of the sheath 6, the rigidity of the metal wire strand increases, so that when the metal wire strand is twisted in one direction and stretched and then twisted in the other direction, kinking may occur because the metal wire strand cannot absorb the elongation of the metal wire strand, and there is a risk that the metal wire strand will be broken. By making the outer diameter of the metal wire strands less than one times the thickness of the sheath 6, as in the present embodiment, the occurrence of such wire break of the metal wire strand can be suppressed, and the occurrence of cracking in the sheath 6 due to rubbing against the broken wire portion of the shield layer 5 can also be suppressed.

When the maximum outer diameter of the cable 1 (i.e., the maximum outer diameter of the sheath 6) is 2.0 mm or less, as in the present embodiment, the thickness of the sheath 6 should be 0.06 mm or more and less than 0.16 mm as described above. Therefore, correspondingly, it can be said that the outer diameter of the metal wire strands used for the shield layer 5 should be 0.03 mm or more and less than 0.16 mm.

Bending Test

Figure 2:
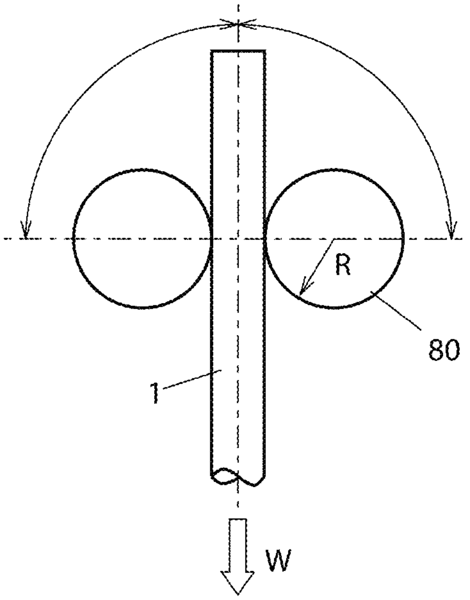
FIG. 2 is an explanatory diagram for explaining a bending test.

A prototype (i.e., sample) of the cable 1 was fabricated and subjected to a bending test. In the bending test, as shown in FIG. 2, a weight with a load W=100 gf was suspended from the lower end of the cable 1 to be the sample, and with a curved-shaped bending jig 80 fitted to the left and right sides of the cable 1, the cable 1 was bent repeatedly along the bending jig 80 to apply a bending angle of +90° to #150° to the left and right directions. The bending radius (bending radius) R was set to be 7.5 times or less than the outer diameter of the cable 1 (outer diameter: approximately 1.6 mm), the bending speed was set at 30 times/min, and the number of bending cycles was counted as one round trip in the left-right direction. The cable 1 was bent repeatedly, and the appearance of the sheath 6 was observed at each appropriate time to check for cracks in the sheath 6. If no cracks appeared in the sheath 6 after 150,000 or more bending cycles, the cable was considered "passed" (○), and if cracks appeared in the sheath 6, the cable was considered "failed" (x). In addition, the resistance value at 150,000 bending cycles was measured, and the rate of increase in resistance from the initial resistance value was calculated. If the calculated rate of increase in resistance was less than 20%, it was considered "passed" (○), and if it was 20% or more, it was considered "failed" (x). The number of samples was three, and in the evaluation of the sheath crack and resistance increase ratio, a sample was considered to have failed if any one of the three samples failed, and was evaluated as passing only if all three samples passed.

As sample cables 1, cable 1 of Example 1, in which the shield layer 5 was composed of a laterally wound shield composed of semi-rigid copper alloy wire and the winding pitch P of the laterally wound shield was 9.5 mm (P/PD=7.0), and cable 1 of Example 2, in which the shield layer 5 was composed of a laterally wound shield composed of semi-rigid copper alloy wire and the winding pitch P was 11.5 mm (P/PD=8.5), were used. In the cables 1 of Examples 1 and 2, semi-hard copper-silver alloy wire (tensile strength: approx. 400 MPa, elongation: 8% to 9%) containing 2 wt % silver and the balance consisting of copper and inevitable impurities was used as the metal wire strands of the shield layer 5, the thickness of the shield layer 5 (the outer diameter of the metal wire strands) was about 0.05 mm, the pitch diameter of the shield layer 5, PD, was 1.36 mm, the thickness of the sheath 6 was about 0.08 mm, and the outer diameter of the cable 1 was about 1.6 mm.

A cable of Comparative Example 1 with a winding pitch P of 13.5 mm (P/PD=9.9) and a cable of Comparative Example 2 with a winding pitch P of 15.0 mm (P/PD=11.0) were also made and flexural tests were performed in the same manner as for the cable 1 of Examples 1 and 2. The cable in Comparative Examples 1 and 2 had the same configuration as the Cables 1 of Examples 1 and 2, except that the winding pitch P was changed.

Furthermore, conventional Example 1, in which the shield layer was formed of a braided shield and the braid pitch was 10.8 mm, and conventional Example 2, in which the shield layer was formed of a braided shield and the braid pitch was 16.6 mm, were made and flexural tests were conducted in the same manner as for the Cables 1 of Examples 1 and 2. In the cables of Conventional Examples 1 and 2, the thickness of the braided shield was set at approximately 0.03 mm and the pitch diameter PD of the shield layer was 1.38 mm. Soft copper alloy wire (tensile strength: approx. 370 MPa, elongation: 12%-13%) containing 0.19 wt % tin and 0.2 wt % indium and the balance consisting of copper and inevitable impurities was used as the metal wire strands that constitute the braided shield. The results of the bending tests on the cables of Examples 1 and 2, Comparative Examples 1 and 2, and Conventional Examples 1 and 2 are summarized in Table 1.

TABLE 1

| | | Example 1 | Example 2 | Comparative Example 1 | Comparative Example 2 | Conventional Example 1 | Conventional Example 2 |
|---|---|---|---|---|---|---|---|
| Shield Layer | Material of wire strand | Cu-2%Ag | | | | Cu-0.19%Sn-0.2%In | |
| | Winding pitch P (mm) | 9.5 | 11.5 | 13.5 | 15.0 | 10.8 (Braid pitch) | 16.6 (Braid pitch) |
| | Shielding method | Laterally wound shield | Laterally wound shield | Laterally wound shield | Latersily wound shield | Braid shield | Braid shield |
| | Pitch diameter PD (mm) | 1.36 | 1.36 | 1.36 | 1.36 | 1.38 | 1.38 |
| | P/PD | 7.0 | 8.5 | 9.9 | 11.0 | 7.8 | 12.0 |
| Bending Test Results | Resistance increase rate (%) | 0 to 1.6 | 0 to 1.3 | 48 to 91 | 9.9 to 58 | 0 | 5.9 to 9.4 |
| | Evaluation | ○ | ○ | x | x | ○ | ○ |
| | Sheath cracking | Absent | Absent | Present | Absent | Present | Present |
| | Evaluation | ○ | ○ | x | ○ | x | x |

As shown in Table 1, in Comparative Examples 1 and 2, where the winding pitch P was increased to 13.5 mm or more and P/PD was set to 9.9 or more, the resistance increase rate was 20% or more, resulting in a resistance increase rate rejection. In conventional Examples 1 and 2, which used a braided shield, cracks were observed in the sheath. In contrast, in Examples 1 and 2, where the winding pitch P was less than 13.5 mm and P/PD was less than 9.9, both the resistance increase ratio and sheath cracking were found to be acceptable.

From the results in Table 1, it was confirmed that by using semi-hard copper alloy wire as the metal wire strands used in the shield layer 5 and setting P/PD at less than 9.9, the rate of increase in resistance due to repeated bending was able to be reduced, cracking in the sheath 6 was able to be suppressed, and resistance to repeated bending of the cable 1 was able to be improved. In other words, according to this embodiment, the resistance of the cable 1 to repeated bending was able to be improved. In other words, according to this embodiment, it is possible to realize the cable 1 with high resistance to bending in which the resistance increase of the metal wire strands constituting the shield layer 5 is less than 20% of the initial resistance value for at least 150,000 repeated bendings at +90 degrees or more in the left-right bending test, and the sheath 6 is not cracked.

Actions and Effects of the Embodiments

As explained above, the cable 1 of this embodiment has the cable core 3 having one or more electric wires 2, the shield layer 5 provided to cover around the cable core 3 and composed of a laterally wound shield in which metal wire strands are helically wrapped, and the sheath 6 provided to cover around the shield layer 5. The metal wire strands used for the shield layer 5 are a semi-rigid copper alloy wire, and P/PD, which is the ratio of the winding pitch P in the laterally wound shield to the pitch diameter PD of the shield layer 5, is less than 9.9.

By this configuration, the cable 1 with high bending resistance can be realized, in which the resistance increase of the metal wire strands constituting the shield layer 5 is less than 20% of the initial resistance value for at least 150,000 repeated bendings in a ±90 degree or more left-right bending test, and the sheath 6 is not cracked. In other words, according to this embodiment, the cable 1 with improved resistance to repeated bending can be realized.

In the cable 1 of the present embodiment, the outer diameter of the metal wire strands constituting the shield layer 5, which is composed of a laterally wound shield, is ½ or more and 1 or less times the thickness of the sheath 6. This makes it possible to suppress the wire breaking of the shield layer 5 by repeated torsion and to suppress the occurrence of cracking in the sheath 6 due to rubbing against the broken wire portions, even when the maximum outer diameter of the sheath 6 is made as thin as 2.0 mm or less and the thickness of the sheath 6 is made as thin as less than 0.20 mm. In other words, according to this embodiment, it is possible to realize a cable 1 in which the sheath 6 is thin and slender and cracks in the sheath 6 are hardly generated by repeated torsion.

Summary of the Embodiments

Next, the technical concepts that can be grasped from the above described embodiments will be described with the help of the codes, etc. in the embodiments. However, each code, etc. in the following description is not limited to the members, etc. specifically shown in the embodiment as the components in the scope of claims.

According to the first feature, a cable 1 comprises a cable core 3 including one or more electric wires 2, a shield layer 5 provided to cover around the cable core 3 and comprising a laterally wound shield in which metal wire strands are helically wrapped, and a sheath 6 provided to cover around the shield layer 5, wherein each of the metallic wire strands is a semi-rigid copper alloy wire, and P/PD, which is a ratio of a winding pitch P in the laterally wound shield to a pitch diameter PD of the shield layer 5, is less than 9.9.

According to the second feature, in the cable 1 according to the first feature, each of the metal wire strands is a semi-hard copper-silver alloy wire containing from 1 wt % or more and 3 wt % or less silver and the balance consisting of copper and inevitable impurities.

According to the third feature, in the cable 1 according to the first or second feature, each of the metal wire strands has a tensile strength of 350 MPa or more and 500 MPa or less and an elongation of 5% or more and less than 10%.

According to the fourth feature, in the cable 1 according to any one of the first to third features, wherein the P/PD is 7.3 or more and less than 9.9.

According to the fifth feature, in the cable 1 according to any one of the first to fourth features, the cable core 3 includes a plurality of first electric wires 21 and a plurality of second electric wires 22 each having a larger outer diameter than each of the first electric wires 21 as the electric wires 2, wherein the cable core 3 has an inner layer 31 composed of the plurality of first electric wires 21 twisted together, and an outer layer 32 composed of the plurality of second electric wires 22 twisted together around the inner layer 31.

According to the sixth feature, in which the cable 1 according to the fifth feature, each of the first electric wires 21 comprises an insulated electric wire having a conductor 211 and an insulator 212 provided to cover around the conductor 211, and each of the second electric wires 22 comprises a coaxial wire having an inner conductor 221, an inner insulator 222 provided to cover around the inner conductor 221, an outer conductor 223 provided to cover around the inner insulator 222, and an outer insulator 224 provided to cover around the outer conductor 223.

The above description of the embodiments of the invention does not limit the invention as set forth in the claims. It should also be noted that not all of the combinations of features described in the embodiments are essential for the invention to solve the problems of the invention.

The invention can be implemented with appropriate modifications to the extent that it does not depart from the intent of the invention. For example, although in the above embodiment, the case in which the cable core 3 includes a plurality of electric wires 2 has been described, but the cable core 3 may be composed of one electric wire 2 without being Limited to this. In this case, the cable 1 may be a coaxial cable with the shield layer 5 and the sheath 6 sequentially provided to cover around one insulated electric wire.

The invention claimed is:

1. A cable comprising:
a cable core including one or more electric wires;
a shield layer provided to cover around the cable core and comprising a laterally wound shield formed by winding metal wire strands helically; and
a sheath provided to cover around the shield layer,
wherein each of the metal wire strands is a semi-hard copper alloy wire,
wherein P/PD, which is a ratio of a winding pitch P in the laterally wound shield to a pitch diameter PD of the shield layer, is less than 9.9,
wherein the cable core includes a plurality of first electric wires and a plurality of second electric wires each having a larger outer diameter than each of the first electric wires as the electric wires, and
wherein the cable core comprises an inner layer comprising the plurality of first electric wires twisted together, and an outer layer comprising the plurality of second electric wires twisted together around the inner layer.

2. The cable according to claim 1, wherein each of the metal wire strands is a semi-rigid copper-silver alloy wire containing 1 wt % or more and 3 wt % or less silver and the balance consisting of copper and inevitable impurities.

3. The cable according to claim 1, wherein each of the metal wire strands has a tensile strength of 350 MPa or more and 500 MPa or less and an elongation of 5% or more and less than 10%.

4. The cable according to claim 1, wherein the P/PD is 7.3 or more and less than 9.9.

5. The cable according to claim 1, wherein each of the first electric wires comprises an insulated electric wire comprising a conductor and an insulator provided to cover around the conductor, and wherein each of the second electric wires comprises a coaxial wire comprising an inner conductor, an inner insulator provided to cover around the inner conductor, an outer conductor provided to cover around the inner insulator, and an outer insulator provided to cover around the outer conductor.

* * * * *